(12) United States Patent
Jen

(10) Patent No.: US 8,543,128 B2
(45) Date of Patent: Sep. 24, 2013

(54) METHOD OF HANDLING POSITIONING MEASUREMENT AND RELATED COMMUNICATION DEVICE

(75) Inventor: Yu-Chih Jen, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 311 days.

(21) Appl. No.: 12/820,158

(22) Filed: Jun. 22, 2010

(65) Prior Publication Data

US 2010/0323720 A1 Dec. 23, 2010

Related U.S. Application Data

(60) Provisional application No. 61/218,989, filed on Jun. 22, 2009.

(51) Int. Cl.
*H04W 72/00* (2009.01)
(52) U.S. Cl.
USPC ............. 455/452.2; 455/522; 455/422.1; 455/67.11; 455/67.14; 455/450
(58) Field of Classification Search
USPC ............. 455/522, 422.1, 67.11, 67.14, 450, 455/452.2
See application file for complete search history.

(56) References Cited

U.S. PATENT DOCUMENTS

| 7,039,418 | B2 | 5/2006 | Amerga | |
|---|---|---|---|---|
| 7,139,580 | B2 | 11/2006 | Stein | |
| 8,208,434 | B2 * | 6/2012 | Sayana et al. | 370/329 |
| 8,265,044 | B2 | 9/2012 | Zhang | |
| 2007/0253501 | A1 * | 11/2007 | Yamaura | 375/262 |
| 2010/0086066 | A1 * | 4/2010 | Chrabieh et al. | 375/260 |
| 2010/0254471 | A1 * | 10/2010 | Ko et al. | 375/260 |
| 2010/0272009 | A1 * | 10/2010 | Cheng et al. | 370/315 |
| 2010/0317343 | A1 * | 12/2010 | Krishnamurthy et al. | 455/435.1 |

FOREIGN PATENT DOCUMENTS

| CN | 1481508 A | 3/2004 |
|---|---|---|
| CN | 1565138 A | 1/2005 |
| CN | 1833462 A | 9/2006 |
| CN | 101345544 A | 1/2009 |
| WO | 2005004527 A1 | 1/2005 |

OTHER PUBLICATIONS

3GPP TR 36.814 V0.4.1 3rd Generation Partnership Project; Technical Specification Group Radio Access Network; Further Advancements for E-UTRA Physical Layer Aspects (Release 9), Feb. 2009.
3GPP TS 25.305 V8.1.0 3rd Generation Partnership Project; Technical Specification Group Radio Access Network; Stage 2 functional specification of User Equipment (UE) positioning in UTRAN (Release 8), Dec. 2008.
3GPP R1-091648 Way forward on OTDOA positioning, Mar. 2009.
3GPP Ts 36.211 V8.7.0 3rd Generation Partnership Project; Technical Specification Group Radio Access Network; Evolved Universal Terrestrial Radio Access (E-UTRA); Physical Channels and Modulation (Release 8), May 2009.
Office action mailed on Sep. 25, 2012 for the China application No. 201010220888.1, filed Jun. 22, 2010, p. 1-12.

\* cited by examiner

*Primary Examiner* — Barry Taylor
(74) *Attorney, Agent, or Firm* — Winston Hsu; Scott Margo

(57) ABSTRACT

A method of handling positioning measurement for a relay in a wireless communications system is disclosed. The method comprises communicating with a mobile device and a base station to serve the mobile device for conveying signaling between the mobile device and the base station, and transmitting a first reference signal associated with a positioning measurement to the mobile device.

6 Claims, 11 Drawing Sheets

METHOD OF HANDLING POSITIONING MEASUREMENT AND RELATED COMMUNICATION DEVICE

CROSS REFERENCE TO RELATED APPLICATIONS

This application claims the benefit of U.S. Provisional Application No. 61/218,989, filed on Jun. 22, 2009 and entitled "Method and Apparatus for enhancement of Relay and CoMP measurement", the contents of which are incorporated herein in their entirety.

BACKGROUND OF THE INVENTION

1. Field of the Invention

The present invention relates to a method used in a wireless communications system and related communication device, and more particularly, to a method of handling positioning measurement corresponding to a mobile device in a wireless communications system with relay deployment and related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs). The UE of the LTE system can transmit and receive data on only one carrier component at any time.

For certain reason, such as emergency consideration, several positioning methods are developed for UE positioning estimation. Positioning methods supported within the E-UTRAN include cell identity (ID) based method, observed time difference of arrival (OTDOA) method, network-assisted Global Navigation Satellite System (GNSS) method, etc. Please note that, the OTDOA positioning method may be assisted by network configurable idle periods (namely OTDOA-IPDL), in order to potentially improve the hearability of neighbouring eNBs. The OTDOA positioning method involves measurements made by a UE, and the measurement results are then sent to the network (e.g. E-UTRAN) for UE positioning estimation.

During positioning measurement, the UE monitors various types of reference signals (e.g. cell state information reference signals (CSI-RS) or cell reference signals (CRS)), and detects arrival times of the reference signals from different cells (e.g. eNBs). After that, the UE generates a measurement report including the arrival times of the reference signals from different cells measured at the UE, and then sends the measurement report to the network. Thus, the network performs the UE positioning estimation based on the measurement report.

A long term evolution-advanced (LTE-A) system, as its name implies, is an evolution of the LTE system, with coordinated multipoint transmission/reception (COMP) and relay deployment. The COMP is considered for LTE-Advanced as a tool to improve coverage of high data rates, cell edge throughput, and system efficiency, which implies dynamic coordination among multiple geographical separated points. That is, when an UE is in a cell-edge region, the UE is able to receive signal from multiple cells, and the multiple cells can receive transmission of the UE.

In addition, a relay node in the LTE-A system is considered to improve the coverage of high data rates, group mobility, temporary network deployment, the cell-edge throughput and to extend coverage. The relay can be deployed at the cell edge where the eNB may not be unable to provide required radio quality/throughput for the UEs that shall be served by the eNB or at certain location where radio signals of the eNB may not cover.

Thus, in the LTE-A system, the UE may simultaneously have links with the eNB and the relay capable of communicating with the eNB when the UE is under both coverage of the eNB and the relay. In addition, transparency of the relay can affect data transmission of the links. That is, with deployment of a transparent relay, the UE is not aware of whether or not the UE communicates with the E-UTRAN with the relay. With deployment of a non-transparent relay, the UE is aware of whether or not the UE communicates with the E-UTRAN with the relay.

However, without consideration with the relay deployment and the COMP in the LTE system, several scenarios are described as follows.

In the first scenario, since the relay deployment is not considered in the LTE system, the LTE system does not consider what role the relay node plays in the positioning measurement. In other words, the LTE system does not specify how the relay node involves in the positioning measurement. Therefore, the UE in the LTE-A system does not know how to perform the positioning measurement with the relay node, when following the LTE specifications, causing measuring problems, especially when time alignment and scheduling rule are not considered yet.

In the second scenario, the UE generates the measurement report based on measurement results associated with the reference signals transmitted from the eNBs. However, within the relay deployment, the UE may generate a measurement report according to a reference signal transmitted from the relay or base station. Currently, the LTE-A system does not specify how the network shall deal with the measurement report associated with the relay.

In the third scenario, the UE transmits the measurement report on an uplink grant when the positioning measurement is completely performed. However, due to the need of accumulation of reference signals under consideration of channel condition, decoding performance, performance accuracy and reference signal pattern, the UE may not be able to finish the positioning measurement before transmitting the measurement report on the uplink grant. The LTE-A system doest not clear define how the UE shall deal with this situation.

In the fourth scenario, the UE performs the measurements (e.g. channel quality measurement, positioning measurement or mobility measurement) within a measurement gap. In the LTE system, a length of the measurement gap is defined as 6 ms at downlink (DL) and 7 ms at uplink (UL). However, with the relay deployment in the LTE-A system, continuous uplink/downlink transmission/reception opportunities are not feasible due to interference consideration of inband relaying operation, and thereby the UE may not perform measurements during a certain subframe or period even though the measurement gap is configured to the UE. Generally, no data reception and transmission can be performed during a period of the measurement gap. Due to possible backhaul downlink reception for inband relaying operation during the measurement gap, the length of the measurement gap for the measurements with the relay deployment shall be reconfigured, so as to avoid transmission efficiency degradation (e.g. UE cannot actually receive anything on certain subframes during 6 ms measurement gap where UE may make use of these subframes for transmission at uplink). In addition, how the UE shall behave during no transmission (e.g. due to discontinuous uplink/downlink transmission opportunities) if the measurement gap is configured shall be a topic for discussion.

In the fifth scenario, both the CSI-RS and the CRS can be utilized for channel quality measurement in the LTE-A system. However, for the COMP operation, the LTE-A system does not define whether the UE can average the measurement result of both the CSI-RS and the CRS for the measurement report and whether the UE can measure different reference signal types (e.g. the CSI-RS and the CRS) from different cells in the COMP operation. Moreover, with current measurement report structure, the network may not know which type of the reference signal the UE was measured when receiving the measurement report from the UE. In addition, LTE-A system does not define whether different reference signal types use the similar transmission power. Since the CSI-RS and the CRS use different reference signal densities or periods, the CSI-RS and the CRS may require different transmission power for transmission. Without knowing the measured reference signal type, the network does not know what transmission power control shall be applied for the measured reference signal type.

In the sixth scenario, when the network configures the UE with the COMP operation, the UE may not have enough time to complete the positioning measurement for all active cells in the COMP operation within a measurement gap. Or, the measurement gap for measuring all active cells may be extremely long, thereby impacting transmission delay and efficiency. However, the LTE-A system does not specify how to deal with this situation.

In addition, since CoMP operating set (e.g. all cells prepared for the UE in advance) is equal or larger than CoMP active set (e.g cells participating the transmission), the rest of cells not in CoMP active set should be able to utilized for UL transmission during measurement gap for cells in active set.

Otherwise, the measurement gap should be configured for part of active cells (e.g. full measurement gap or part of measurement gap first in average) so that the rest of active cells not being measured could serve UE (e.g. take turns).

In addition, it's not clear how network decide to configure measurement gap due to different CSI-RS/CRS periods and patterns among active cells.

SUMMARY OF THE INVENTION

A method of handling positioning measurement in a wireless communications system is disclosed to solve the above-mentioned problems.

A method of handling positioning measurement for a relay in a wireless communications system is disclosed. The method comprises communicating with a mobile device and a base station to serve the mobile device for conveying signaling between the mobile device and the base station, and transmitting a first reference signal associated with a positioning measurement to the mobile device.

A method of handling positioning measurement for a mobile device in a wireless communications system is disclosed. The method comprises according to a positioning configuration predefined or acknowledged from a network of the wireless communications system, performing a positioning measurement to generate a positioning measurement report, and including positioning measurement result of at least one of measured arrivals of reference signals corresponding to at least one of a relay and a base station of the wireless communications system in the positioning measurement report when the reference signals are detected and received from at least one of the relay and the base station.

A method of handling positioning measurement for a mobile device in a wireless communications system is disclosed. The method comprises according to a positioning configuration predefined or acknowledged from a network of the wireless communications system, performing a positioning measurement to generate a positioning measurement report, and including positioning measurement result of at least an arrival of reference signal corresponding to the relay in the positioning measurement report when the reference signal is received from the relay and no reference signal is received from the base station, or only the relay transmits the reference signal.

A method of handling positioning measurement for a network in a wireless communications system is disclosed. The method comprises receiving a positioning measurement report from a mobile device of the wireless communications system, wherein the positioning measurement report comprises a measurement result associated with a reference signal that a relay of the network transmits to the mobile device, obtaining at least one of a related transmission timing of the reference signal associated with the relay, and a transmission location of the relay, and estimating a positioning of the mobile device according to the positioning measurement report, the related transmission timing, and the transmission location.

A method of handling positioning measurement for a mobile device in a wireless communications system is disclosed. The method comprises activating a positioning measurement to generate a positioning measurement report, receiving an uplink grant assigned by a network of the wireless communications system, and with the assigned uplink grant, transmitting the positioning measurement report at the resource of the assigned uplink grant.

A method of handling measurement for a network in a wireless communications system is disclosed. The method comprises determining a length of a measurement gap for a mobile device according to at least an uplink or downlink transmission opportunity, wherein the length of measurement gap is dynamic or semi-static, and configuring to the mobile device the measurement gap during which a measurement is performed.

A method of handling measurement for a mobile device in a wireless communications system is disclosed. The method comprises receiving configuration of a measurement gap from a network of the wireless communications system, and further comprising at least one of skipping performing at least a first measurement of at least a first subframe or period within the measurement gap, and performing at least a second measurement of at least a second subframe or period within the measurement gap.

A method of handling measurement for a mobile device in a wireless communications system is disclosed. The method comprises activating a measurement, measuring cell state information reference signals (CSI-RS) or cell reference signals (CRS) from a plurality of cells associated with a coordinated multipoint transmission/reception (COMP) operation and configured for the mobile device or for a CoMP measurement, and generating a measurement report including measurement result of measuring at least one of the CSI-RS and the CRS of each measured cell in the measurement report for each measured cell in the measurement report.

A method of handling measurement for a network in a wireless communications system is disclosed. The method comprises configuring a plurality of cells to a mobile device of the wireless communications system for coordinated multipoint transmission/reception (COMP) operation, and assigning the mobile device to measure full set or a first subset of the plurality of cells for a measurement.

These and other objectives of the present invention will no doubt become obvious to those of ordinary skill in the art after reading the following detailed description of the preferred example that is illustrated in the various figures and drawings.

DETAILED DESCRIPTION

Figure 1:
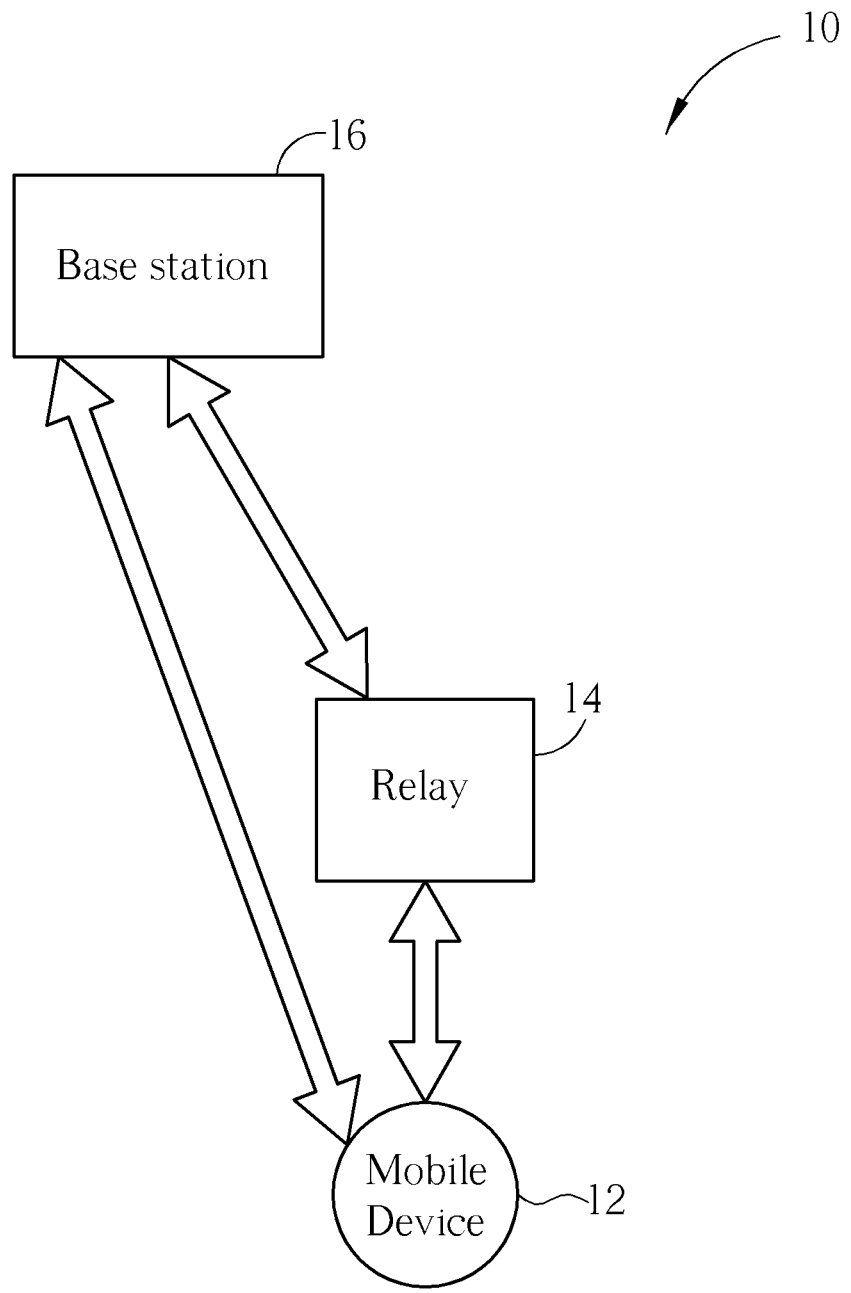
FIG. 1 is a schematic diagram of an exemplary wireless communications system.

FIG. 1 illustrates a schematic diagram of a wireless communications system 10 according to an example. The wireless communications system 10 includes a base station (BS) 16, a relay 14 and a mobile device 12 wirelessly coupled to the relay 14. The wireless communications system 10 may be a UMTS (Universal Mobile Telecommunications System), an LTE (long-term evolution) system, an LTE-A (LTE-Advance) or any other similar network system. In the LTE system, the base station 16 and the relay 14 can be regarded as part of a network, e.g. a EUTRAN (evolved-UMTS Terrestrial Radio Access Network), comprising a plurality of eNBs (evolved Node-Bs) each controlling a cell. In addition, in the LTE system, the base station 16 is referred as the eNB. The mobile device 12 is referred as to a user equipment (UE) that can be devices such as mobile phones, computer systems, etc. This terminology will be used throughout the application for ease of reference, and however, this should not be construed as limiting the scope of the disclosure to any one particular type of network. The network and the UE can be seen as a transmitter or receiver according to transmission direction, e.g., for uplink (UL), the UE is the transmitter and the network is the receiver, and for downlink (DL), the network is the transmitter and the UE is the receiver.

The relay 14 is responsible for handling and conveying signaling from the base station 16 assigned as a donor base station to the mobile device 12 or signaling from the mobile device 12 to the base station 16, thereby maintaining a throughput between the mobile device 12 and the base station 16 above a certain required level. On the other hand, the mobile device 12 of FIG. 1 may be located under coverage of the relay 14 and the base station 16, and thereby is able to receive radio signals from the base station 16 and the relay 14.

Moreover, the relay 14 may be a transparent relay with which the UE is not aware of whether or not it communicates with the network via the relay 14. Or the relay 14 may be a non-transparent relay with which the UE is aware of whether or not it is communicating with the network via the relay 14. In addition, the relay 14 may include a physical cell identify (PCI) that is assigned to a cell controlled by the relay 14, and a relay identity (ID). The PCI and the relay ID are layer 1 radio signatures. When the PCI of the relay 14 is different from the PCI of the cell controlled by the base station 16, the PCI of the relay 16 is considered a separated PCI. Please note that, the relay 14 as the transparent relay may have its own PCI, but does not signal its relay ID, whereas the relay 14 as the non-transparent relay may have its own PCI, and signals its relay ID.

The wireless communications system 10 is a simplified example to explain the concept of the disclosure, and the relay 14 may simultaneously communicate with multiple base stations via multiple connections. In addition, the relay 14 may be part of a donor cell controlled by the base station 16 assigned as the donor base station, or control cells of its own.

Figure 2:
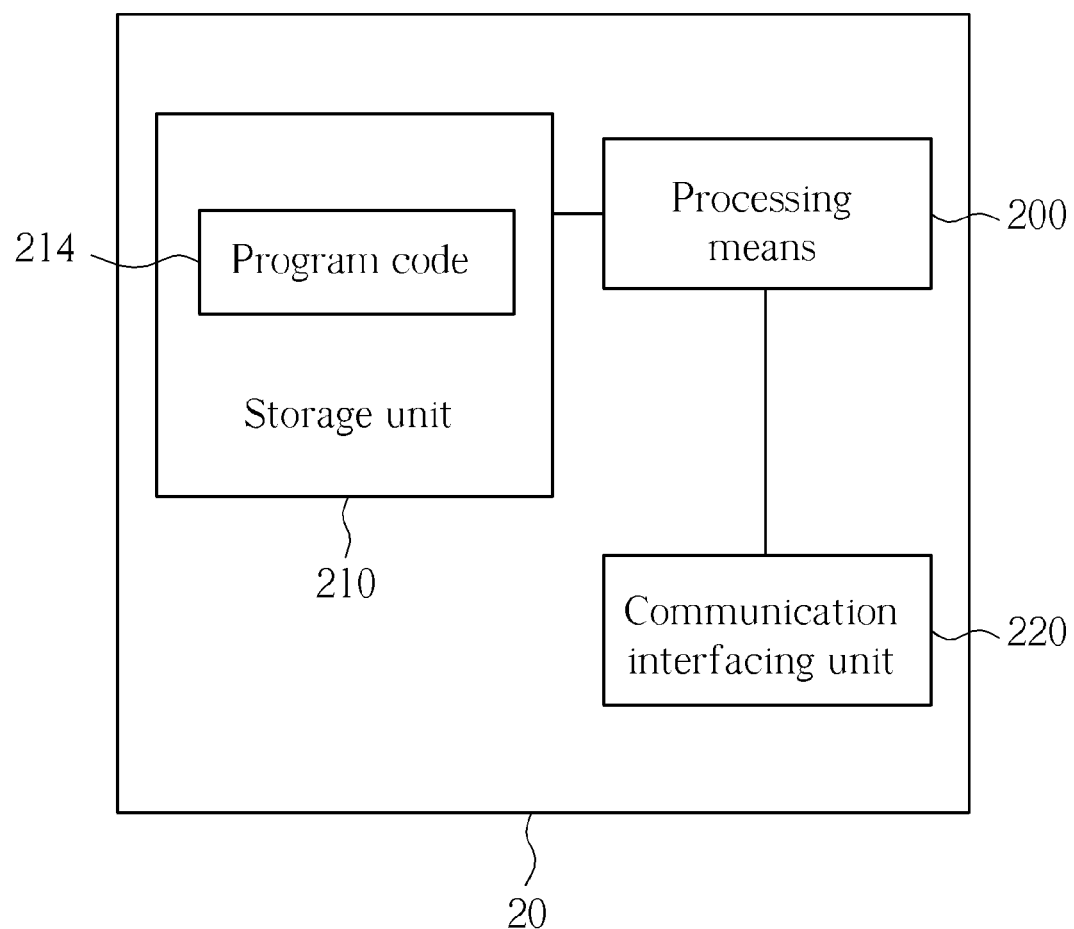
FIG. 2 illustrates a schematic diagram of an exemplary communication device.

FIG. 2 illustrates a schematic diagram of an exemplary communication device 20. The communication device 20 can be the mobile device or the network shown in FIG. 1. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), random-access memory (RAM), CD-ROMs, magnetic tapes, hard disks, and optical data storage devices. The communication interfacing unit 220 is preferably a radio transceiver and can exchange wireless signals with the network according to processing results of the processing means 200.

Figure 3:
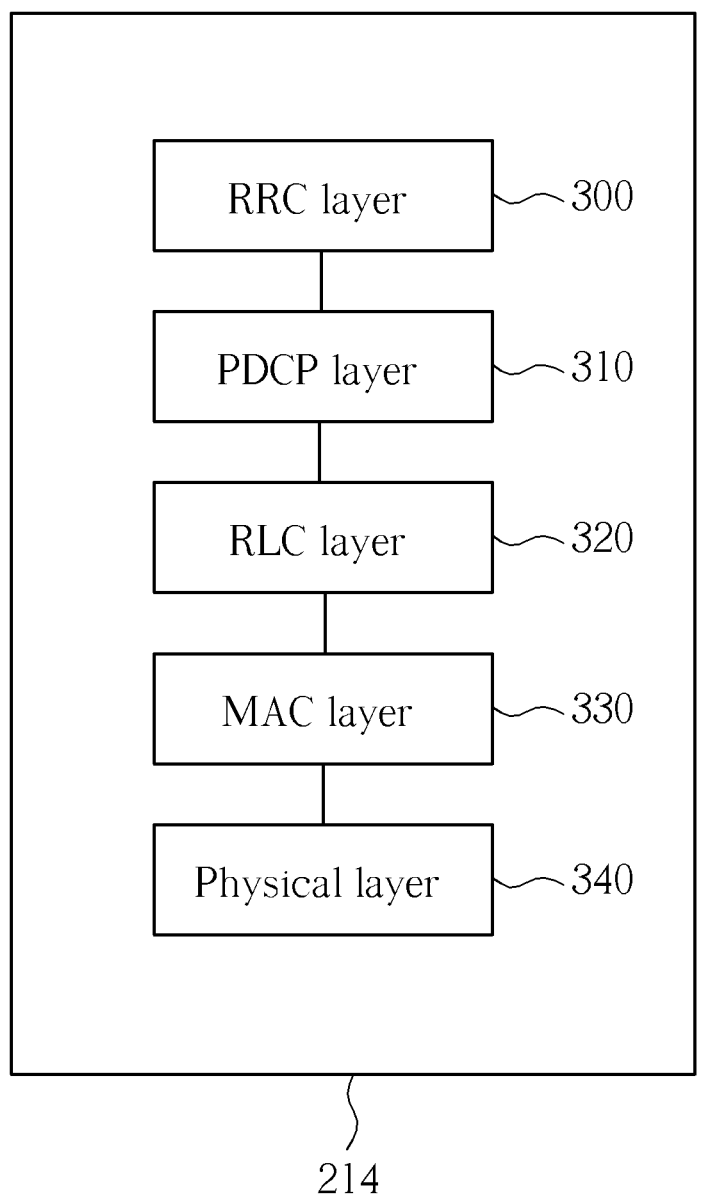
FIG. 3 illustrates a schematic diagram of exemplary program code.

Please refer to FIG. 3, which illustrates a schematic diagram of the program code 214 for the LTE-Advanced system according to an example. The program code 214 includes program code of multiple communications protocol layers, which from top to bottom are a radio resource control (RRC) layer 300, a packet data convergence protocol (PDCP) layer 310, a radio link control (RLC) layer 320, a medium access control (MAC) layer 330 and a physical (PHY) layer 340. When the communication device 20 is referred as to the mobile device 12 shown in FIG. 1, the RRC layer 300 of the communication device 20 obtains measurement results from the MAC layer 330 and the physical layer 340, and generates a measurement report based on the measurement results. Then, the measurement report is sent to the network (e.g. the base station 16 or the relay 14). On the other hand, when the communication device 20 is referred as to the network, the RRC layer 300 of the network may provide the mobile device with required information (e.g. assistance data) for a measurement.

Figure 4:
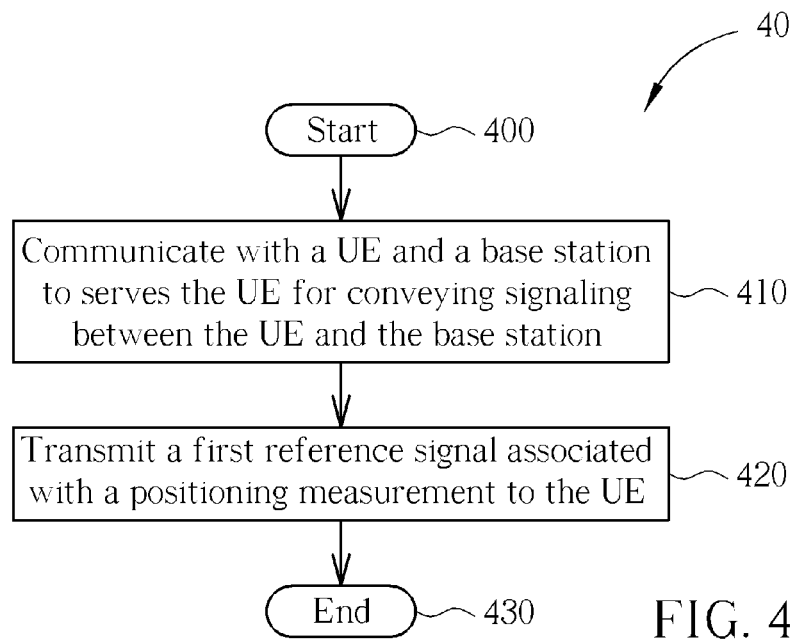
FIG. 4-12 are flowcharts of exemplary processes according to the present disclosure.

Please refer to FIG. 4, which illustrates a flowchart of an exemplary process 40. The process 40 is utilized in a relay of a wireless communications system for handling the position measurement. The process 40 may be compiled into the program code 214 and includes the following steps:

Step 400: Start.

Step 410: Communicate with a UE and a base station to serves the UE for conveying signaling between the UE and the base station.

Step 420: Transmit a first reference signal associated with a positioning measurement to the UE.

Step 430: End.

According to the process 40, the relay is involved in the positioning measurement, and is capable of transmitting the reference signal (RS) to the UE for the positioning measurement. Accordingly, the UE measures the RS from the relay, and generates a measurement report based on a measurement result associated with the relay.

The RS may be generated by the base station or the relay. If the RS is generated by the base station, the relay may forward the RS transmitted from the base station to the UE, or may transmit the RS prescheduled by the base station to the UE (e.g. the base station indicates to the relay when to transmit the RS). On the other hand, if the RS is generated by the relay, the relay may transmit the RS scheduled by the relay itself to the UE, where the RS generated by the relay may use the same pattern as the base station or a specific pattern (e.g. a dedicated pattern or a common pattern).

When the relay is a transparent relay, the RS transmitted from the relay may be scheduled by the base station at a first subframe, or may be scheduled by the relay at a second subframe. Therefore, the RSs from the base station 16 and the relay 14 may be transmitted at the same time (e.g. for transmission timing alignment) or apart with a certain offset (e.g. for reception timing alignment or time diversity), and may be transmitted with the same positioning configuration (e.g. positioning resource or pattern) as the base station, or different positioning configurations. Moreover, a positioning resource (e.g. time and/or frequency) for transmitting the RS from the relay to the UE may be scheduled by the relay or by the base station. That is, the relay may autonomously schedule the positioning resource for transmitting the RS to the UE, or may obtain from the base station the positioning resource for transmitting the RS to the UE.

In addition, when the RSs from at least one of the relay and the base station are detected and received by the UE, the UE includes measurement results of the measured arrivals of RSs corresponding to at least one of the relay and the base station in the measurement report. Then, the measurement report may be sent to the base station or to the relay. On the other hand, the UE may receives the RS only from the relay or only the relay transmits the RS (namely, the base station does not transmit the RS). In this situation, the UE only includes measurement result of the measured arrival of RS corresponding to the relay in the measurement report. Please note that, the measurement result included in the measurement report is determined by the UE according to at least one of a reference signal quality, a reference signal arrival timing, a physical cell identity, a reference signal pattern, and a positioning configuration predefined or acknowledged from the network.

Furthermore, the UE includes a PCI of the base station in the measurement report when the measured arrival of the RS corresponding to the base station is included in the positioning measurement report, and includes an identification of the relay when the measured arrival of the RS corresponding to the relay is included in the measurement report. The identification is a separate PCI, or a relay identity, or the PCI of the base station if the relay has no PCI and is under control of the base station.

Please note that, instead of the PCIs, the relay ID, and the RS arrival time, the measurement report may further include RS pattern indication, arrival sequence indication, etc.

Referring back to FIG. 1, take an example base on the concept of the process 40. Assume the mobile device 12 (hereafter called the UE) receives RSs from the relay 14 and the base station 16. The RS transmitted from the relay 14 may be prescheduled by the base station 16 or scheduled by the relay 14 autonomously. When the UE receives the positioning configuration(s) from the network (e.g. from the base station 16 only, or from the base station 16 and the relay 14), the UE starts to perform the positioning measurement according to the received positioning configuration (s), and then generates a measurement report. After the UE receives the RSs from the relay 14 and base station 16, the UE includes measurement results of measured arrivals of the RSs from the relay node 14 and the base station 16 in the measurement report (e.g. in the sequence according to quality, arrival timing, or pattern of the RSs). In addition, the UE further includes a PCI1 of the base station 16 and a PCI2 of the relay 14 in the measurement report, so that the network can identify that the measurement results belong to the base station 16 and the relay 14 according to the PCI1 and PCI2.

Moreover, the relay 14 as the transparent relay does not signal the relay ID of its own. If the relay 14 does not have its own PCI and shares the same PCI with the base station 16 (namely the PCI2 is the same as the PCI1), the UE includes the PCI1 only once or both of the PCI1 and PCI2 when both of the arrival times of the RSs from the relay 14 and the base station 16 are included in the measurement report. On the other hand, the relay 14 as the non-transparent relay signals the relay ID of its own. If the relay 14 does not have its own PCI and shares the same PCI with the base station 16 (namely the PCI2 is the same as the PCI1), the UE includes the PCI1 of the base station 16 and the relay ID of the relay 14 when both of the arrival times of the RSs from the relay 14 and the base station 16 are included in the measurement report.

Based on the process 40, whether the relay involves in the positioning measurement is clearly specified, and thereby the UE performs the positioning measurement within the relay deployment.

Figure 5:
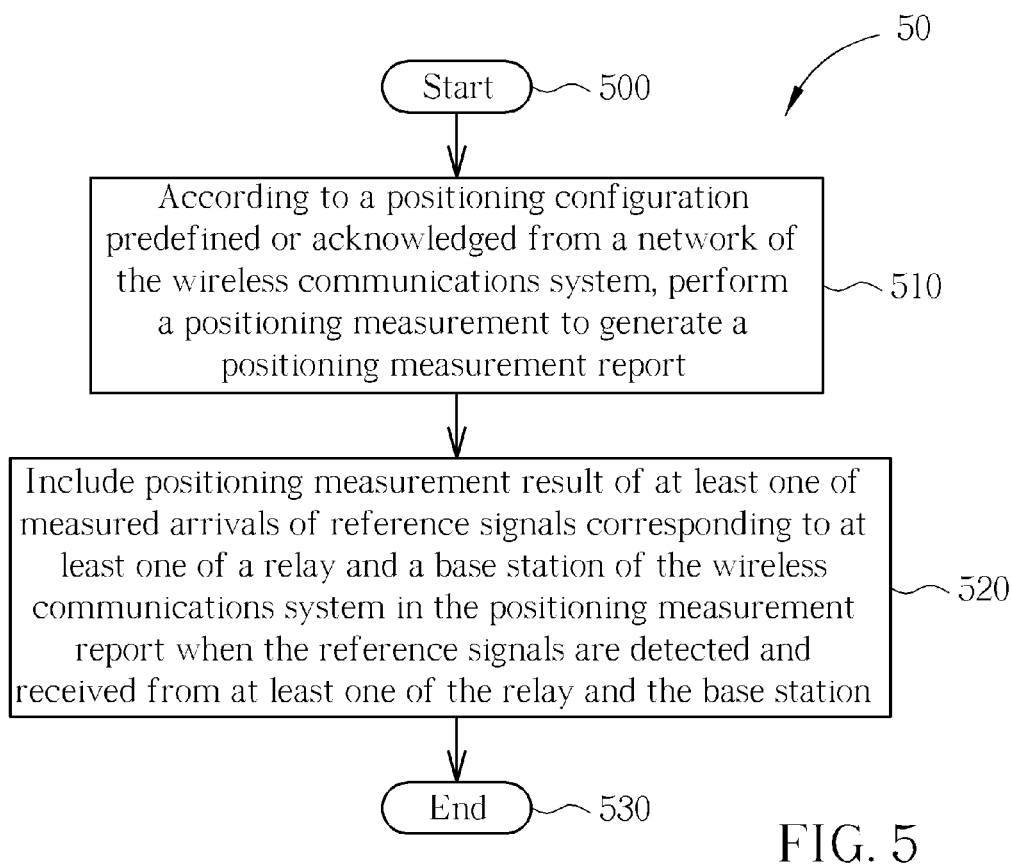

Please refer to FIG. 5, which illustrates a flowchart of an exemplary process 50. The process 50 is utilized in a UE as the mobile device 12 of FIG. 1 of a wireless communications system for handling the position measurement. The process 50 may be compiled into the program code 214 and includes the following steps:

Step 500: Start.

Step 510: According to a positioning configuration predefined or acknowledged from a network of the wireless communications system, perform a positioning measurement to generate a positioning measurement report.

Step 520: Include positioning measurement result of at least one of measured arrivals of reference signals corresponding to at least one of a relay and a base station of the wireless communications system in the positioning measurement report when the reference signals are detected and received from at least one of the relay and the base station.

Step 530: End.

According to the process 50, the UE performs the positioning measurement according to the positioning configuration received from the network. When the UE receives the RS from at least one of the relay and the base station, the UE includes the measurement result of at least one of measured arrivals of the RSs from at least one of the relay and the base station in the measurement report.

In addition, the UE further includes a first PCI of the base station in the measurement report when the measurement result of the measured arrival of the reference signal from the base station is included in the measurement report, and includes an identification of the relay in the measurement report when the measurement result of the measured arrival of the reference signal from the relay is included in the measurement report. The identification may include a second PCI, or a relay identity, or the first PCI if the relay has no PCI and is under control of the base station.

Please note that, if the relay is a non-transparent relay, the UE includes the first PCI of the base station and the second PCI of the relay in the measurement report, or includes the first PCI of the base station and the relay identity of the relay in the measurement report. Moreover, if the relay as the non-transparent relay has no PCI of its own and is under control of the base station, the UE may include the first PCI for the relay in the measurement report instead. On the other hand, if the relay is a transparent relay, since the transparent relay has no relay indication, the UE includes only the first PCI of the base station and the second PCI (or the first PCI for the relay if the relay has no PCI and is under control of the base station) of the relay in the measurement report.

Figure 6:
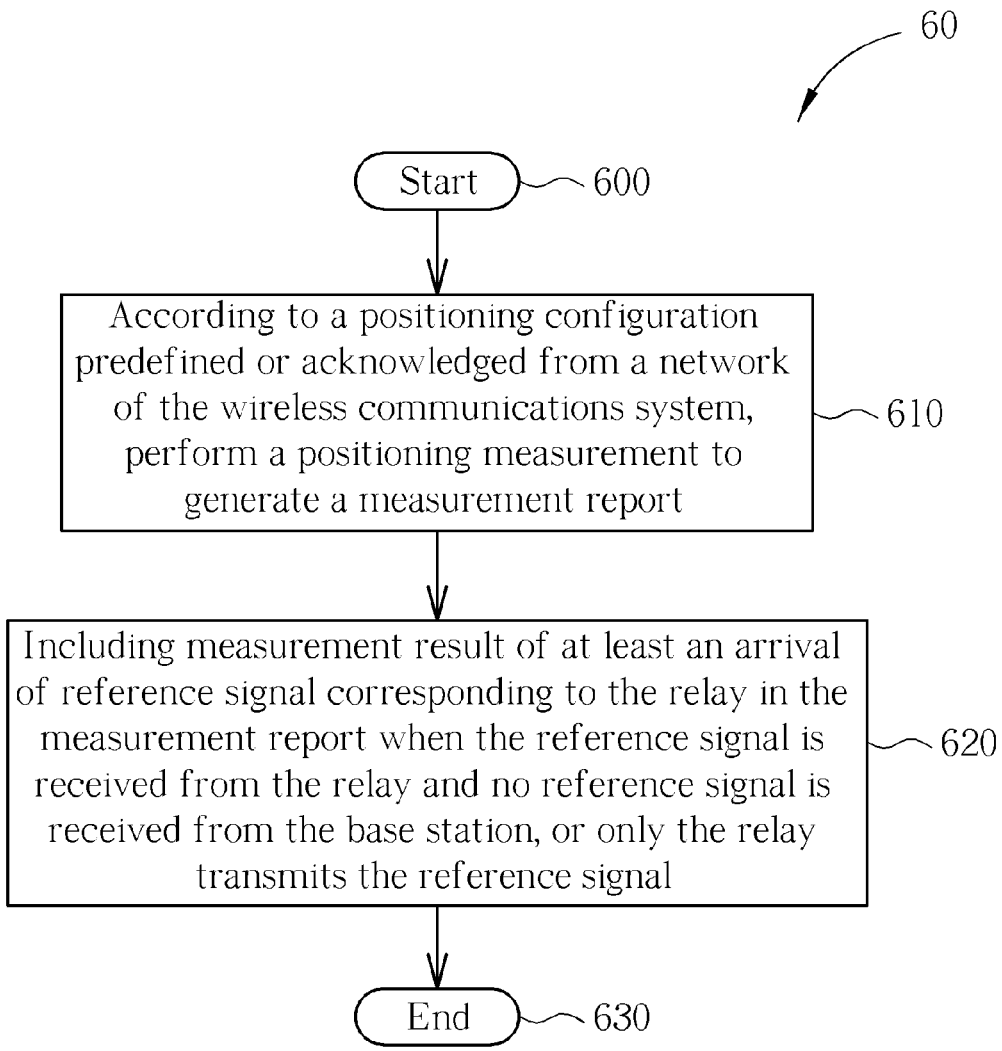

Please refer to FIG. 6, which illustrates a flowchart of an exemplary process 60. The process 60 is utilized in a UE as the mobile device 12 of FIG. 1 of a wireless communications system for handling the position measurement. The process 60 may be compiled into the program code 214 and includes the following steps:

Step 600: Start.

Step 610: According to a positioning configuration predefined or acknowledged from a network of the wireless communications system, perform a positioning measurement to generate a measurement report.

Step 620: Including measurement result of at least an arrival of reference signal corresponding to the relay in the measurement report when the reference signal is received from the relay and no reference signal is received from the base station, or only the relay transmits the reference signal.

Step 630: End.

According to the process 60, the UE performs the positioning measurement according to the positioning configuration received from the network. When the UE receives the RS from the relay only (e.g. only the relay transmits the RS and the base station does not transmit the RS, or the UE receives the RS only from the relay), the UE includes the measurement result of measured arrival of the RS from the relay in the measurement report.

In addition, the UE includes at least one of a PCI and relay indication of the relay in the measurement report when the measurement results of the measured arrival of the reference signal corresponding to the relay is included in the measurement report.

Referring back to FIG. 1, take an example base on the concept of the process 60. Assume the mobile device 12 (hereafter called the UE) receives RS from the relay 14 only. The RS transmitted from the relay 14 may be prescheduled by the base station 16 or scheduled by the relay 14 autonomously. When the UE receives the positioning configuration from the network, the UE starts to perform the positioning measurement according to the received positioning configuration, and then generates a measurement report. After the UE receives the RS from the relay 14, the UE includes the measurement result of measured arrival of the RS from the relay node 14 in the measurement report along with the PCI of the relay 14. Therefore, the network can identify the arrival time of the RS according to the PCI of the relay 14, and then performs the UE positioning estimation according to the measurement report associated with the relay 14.

Based on the process 60, when the UE performs the positioning measurement with the relay deployment, the UE includes a measurement result associated with the relay in the measurement report along with the PCI of the relay, so that the network can make use of the measurement report associated with the relay for UE positioning estimation.

Figure 7:
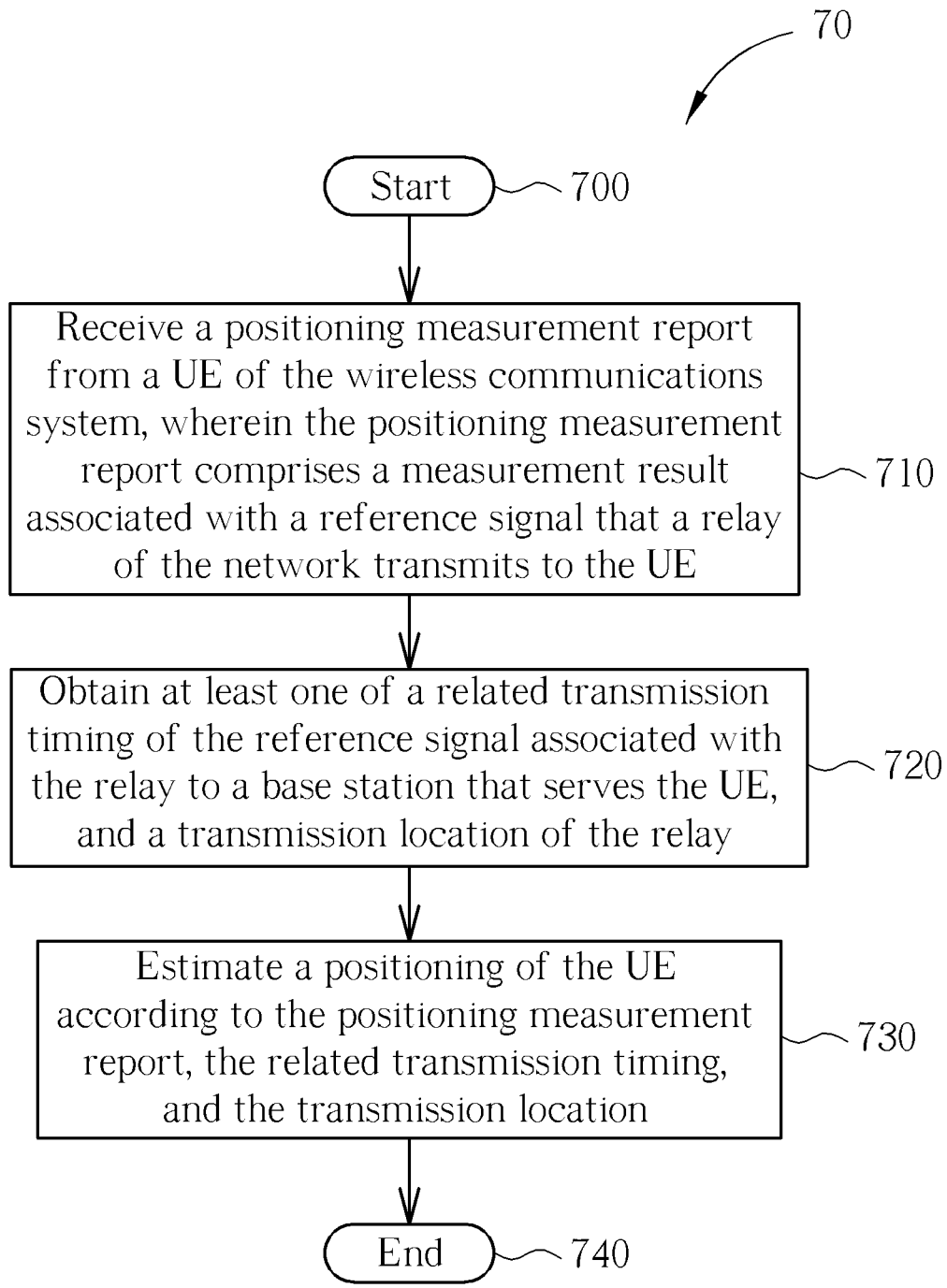

Please refer to FIG. 7, which illustrates a flowchart of an exemplary process 70. The process 70 is utilized in a network of a wireless communications system for handling the position measurement. The process 70 may be compiled into the program code 214 and includes the following steps:

Step 700: Start.

Step 710: Receive a positioning measurement report from a UE of the wireless communications system, wherein the positioning measurement report comprises a measurement result associated with a reference signal that a relay of the network transmits to the UE.

Step 720: Obtain at least one of a related transmission timing of the reference signal associated with the relay to a base station that serves the UE, and a transmission location of the relay.

Step 730: Estimate a positioning of the UE according to the positioning measurement report, the related transmission timing, and the transmission location.

Step 740: End.

According to the process 70, the network (e.g. the base station or the relay) estimates the UE positioning with the measurement report including the measurement result of the RS from the relay, the RS transmission location of the relay, and the related RS transmission timing of the relay to the base station. That is, the network estimates the UE positioning with the consideration of related transmission timing of the RS transmitted by the relay and the transmission location of the relay since the measurement result is based on the RS from the relay instead of a serving base station of the UE. Therefore, the network shall make use of not only the positioning measurement report, but also the related transmission timing of the relay to the serving base station and the transmission location of the relay, so as to correctly estimate the UE positioning.

Please note that, the related transmission timing of the relay to the serving base station may indicate that a RS transmission timing difference between the serving base station and the relay, namely the timing of serving base station is used as reference timing for the relay. Due to different propagation delays, the network needs the RS arrival time associated with the relay and the related transmission timing of the relay to the serving base station for distance estimation. The function of the related transmission timing and the RS arrival time is well-known in the art, so it is not given here.

In addition, the relay may be a transparent relay. Therefore, the relay has no PCI and does not signal a relay indication associated with the relay, or has a PCI, but does not signal the relay indication. On the other hand, the relay may be a non-transparent relay. Therefore, the relay has no PCI but signals a relay indication associated with the relay, or has a PCI, and signals the relay indication.

Figure 8:
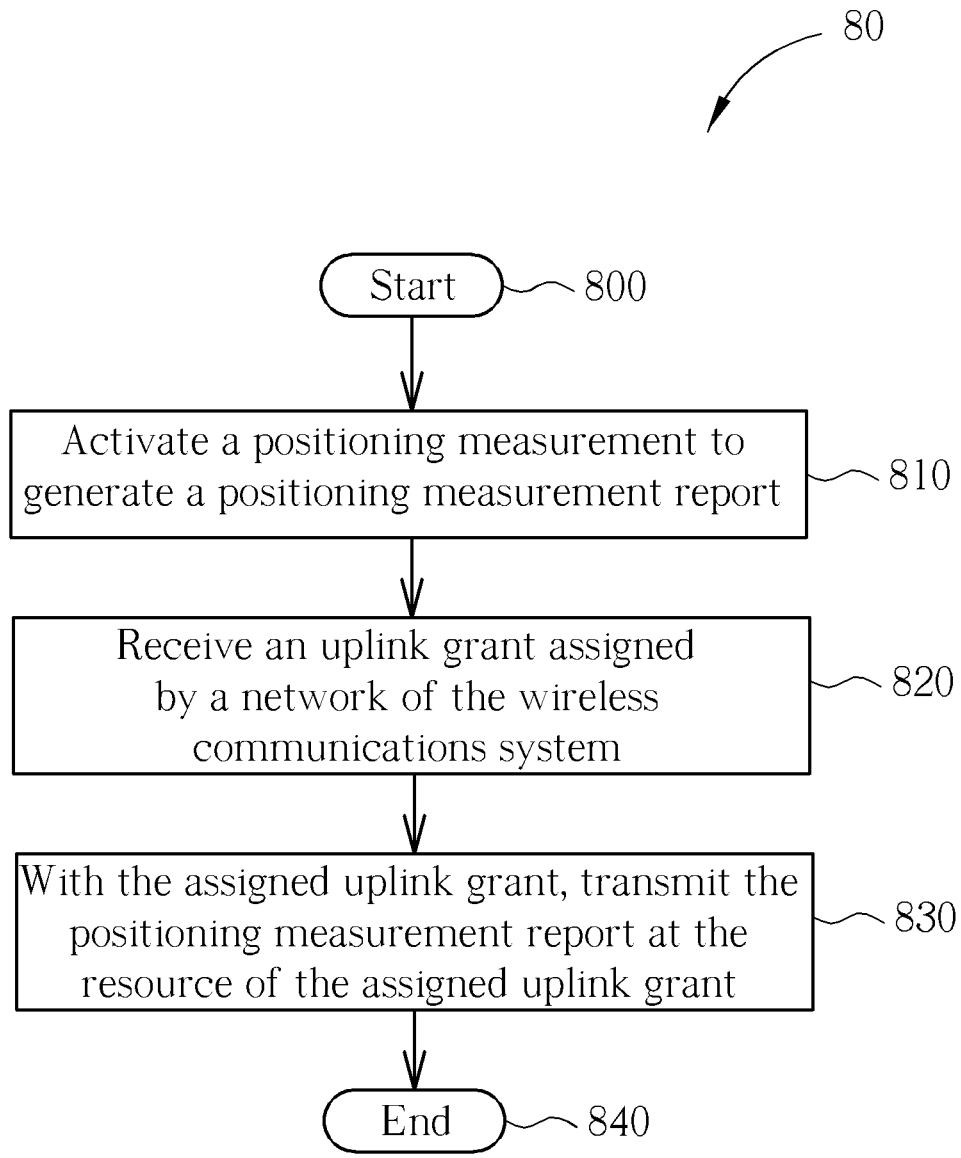

Please refer to FIG. 8, which illustrates a flowchart of an exemplary process 80. The process 80 is utilized in a UE of a wireless communications system for handling the position measurement. The process 80 may be compiled into the program code 214 and includes the following steps:

Step 800: Start.

Step 810: Activate a positioning measurement to generate a positioning measurement report.

Step 820: Receive an uplink grant assigned by a network of the wireless communications system.

Step 830: With the assigned uplink grant, transmit the positioning measurement report at the resource of the assigned uplink grant Step 840: End.

According to the process 80, the UE transmits the measurement report with the assigned UL grant. The assigned uplink grant may be scheduled for the measurement report or requested by the UE. More specifically, the assigned UL grant may be configured in a positioning configuration associated with the positioning measurement, assigned upon activation of the positioning measurement, or request by the UE.

Moreover, the UE may determine whether the positioning measurement is completed. Before expiration of a period of validity of the assigned uplink grant, the UE may transmit no measurement report when the positioning measurement is not completely performed or the requirement of measurement result for positioning is not met. Alternatively, the UE may transmit whatever has been measured for positioning to the network when the positioning measurement is not completely performed or the requirement of measurement result for positioning is not met.

Please note that, the positioning measurement is considered completed if RSs from at least three cells have been measured, or if accumulation of RSs from each of at least three cells is in process or partially measured (e.g. the RSs from two cells have been measured while accumulation measurement of one cell is in process). Therefore, the UE transmits the measurement report to the network with the assigned UL grant. Moreover, the UE reports the measurement report along with an identity or an indication to the network, and thereby the network can identify the measurement report by the identity or the indication. The identity or the indication comprises a local channel identity (LCID) or a radio network temporary identifier (RNTI). Please note that, the LCID may be identified at the RLC layer 320 or the MAC layer 330 of the network, whereas the RNTI may be identified at the PHY layer 340 of the network. In addition, the indication may be included in a MAC header, or scrambling at a PHY layer 340.

Furthermore, the UE may transmit the measurement report at the resource of the assigned uplink grant according to certain rules. Please note that, the network requires measurement results of at least three cells for the positioning estimation. Therefore, the UE may perform the positioning measurement corresponding to at least three cells.

Take examples for illustrating the abovementioned certain rules. In the first example, assume that the UE has finished measurement of reference signal(s) from A cell(s) but less than or equal to B (e.g. B is predefined/preconfigured and B=3) cells. The UE may include the measurement result(s) of the A measured cell(s) and the PCIs of the A measured cell(s) in the measurement report, and then transmits the measurement report to the network with the assigned UL grant. Please note that, if each of the measured cell(s) has a separate PCI, the UE includes each of PCIs of the measured cell(s). Moreover, the UE may include an additional PCI with no measurement result for implement the measurement report requirement.

In the second example, assume the UE has finished measurement of reference signals from C cells and more than D cells (e.g. D is predefined/preconfigured and D=3). The UE includes the measurement results of the D measured cells and the PCIs of the D measured cells in the measurement report, and then transmits the measurement report to the network with the assigned UL grant. In addition, if each of the measured cells has a separate PCI, the UE may include each of PCIs of the measured cells.

In the third example, assume the UE has finished measurement of reference signals from C cells and more than D cells (e.g. D is predefined/preconfigured and D=3). The UE includes the measurement results of the C measured cells and the PCIs of the C measured cells in the measurement report, and then transmits the measurement report to the network with the assigned UL grant. In addition, if each of the measured cells has a separate PCI, the UE may include each of PCIs of the measured cells.

In the fourth example, assume the UE has finished no measurement of reference signals from any of the three cells. The UE includes no measurement result of any of the three cells, but includes at least a PCI of the three cells in the measurement report. After that, the UE transmits the measurement report the network with the assigned uplink grant.

For any of the abovementioned examples, the assigned UL grant shall be sufficient for transmitting the measurement report. On the other hand, a size of the measurement report is up to a size associated with the assigned UL grant.

Figure 9:
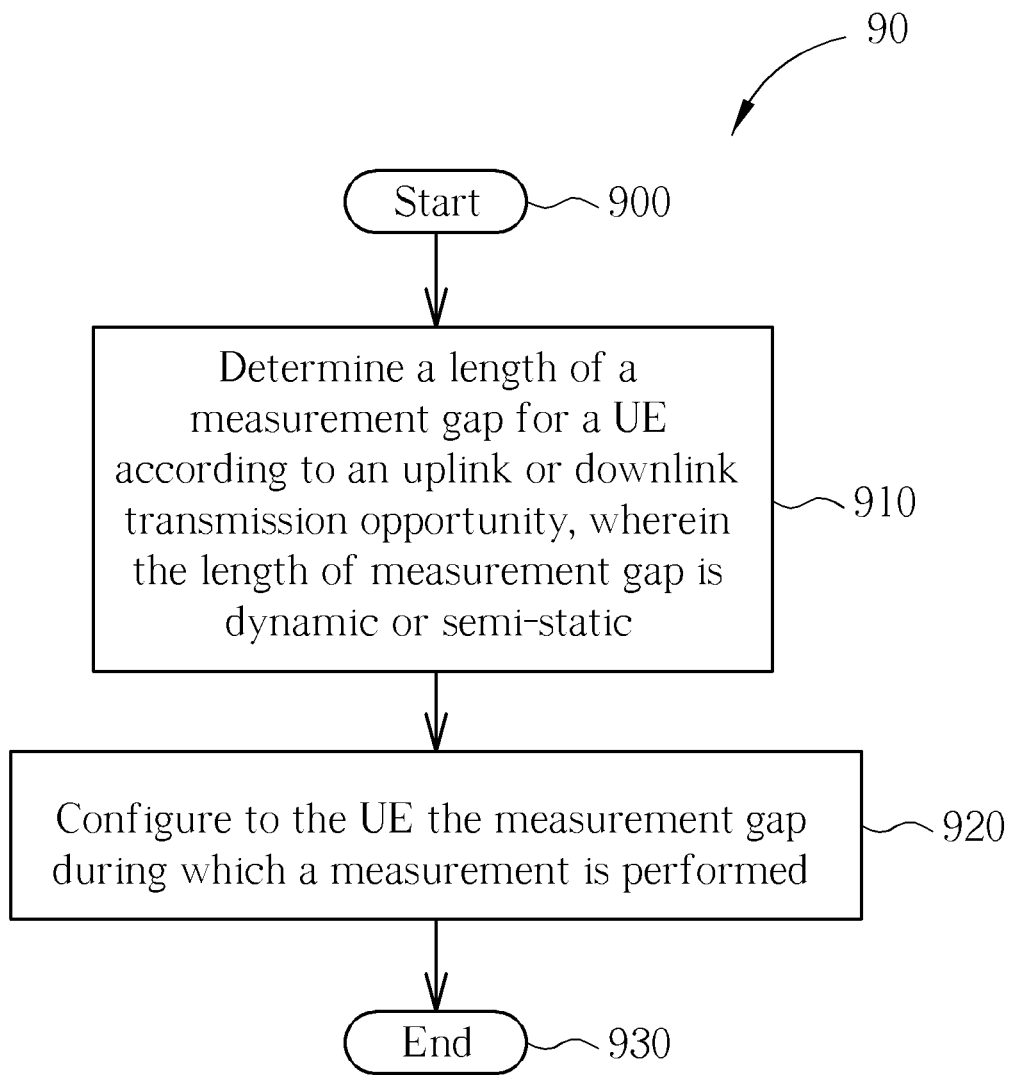

Please refer to FIG. 9, which illustrates a flowchart of an exemplary process 90. The process 90 is utilized in a network of a wireless communications system for handling a measurement. The process 90 may be compiled into the program code 214 and includes the following steps:

Step 900: Start.

Step 910: Determine a length of a measurement gap for a UE according to at least an uplink or downlink transmission opportunity, wherein the length of measurement gap is dynamic or semi-static.

Step 920: Configure to the UE the measurement gap during which a measurement is performed.

Step 930: End.

According to the process 90, the UE performs the measurement within the measurement gap whose length is configured by the network (e.g. a base station or a relay) according to the UL or DL transmission opportunity (e.g. a number of continuous DL or UL subframes). That is, a dynamic or semi-static length of the measurement gap is allowed, so that the UE can receive signaling from the relay for the measurement during the measurement gap.

In addition, 6 ms at DL transmission and 7 ms at UL transmission are defined for the measurement gap in the LTE system. Due to discontinuous UL/DL transmission within the inband relaying operation, the UE may not receives signaling from the relay during a period of BS-to-relay transmission. Since the UE cannot perform the measurement corresponding to the relay during the period of BS-to relay transmission within the measurement gap, the measurement gap as this length (e.g. 6 ms at DL transmission and 7 ms at UL transmission) may cause transmission efficiency degradation. Therefore, the length of the measurement gap shall be configured dynamically or semi-statically according to the transmission opportunity. Moreover, the length of the measurement gap shorter than 6 ms at DL or 7 ms at UL shall be allowed, thereby increasing transmission efficiency of the UE.

Furthermore, the UE may perform a random access procedure during the measurement gap. More specifically, the UE performs the random access procedure during the period of BS-to-relay transmission within the measurement gap, where the UE doesn't expect any DL transmission including reference signal for measurement since the relay does not transmit anything to the UE during the period of BS-to-relay transmission.

Figure 10:
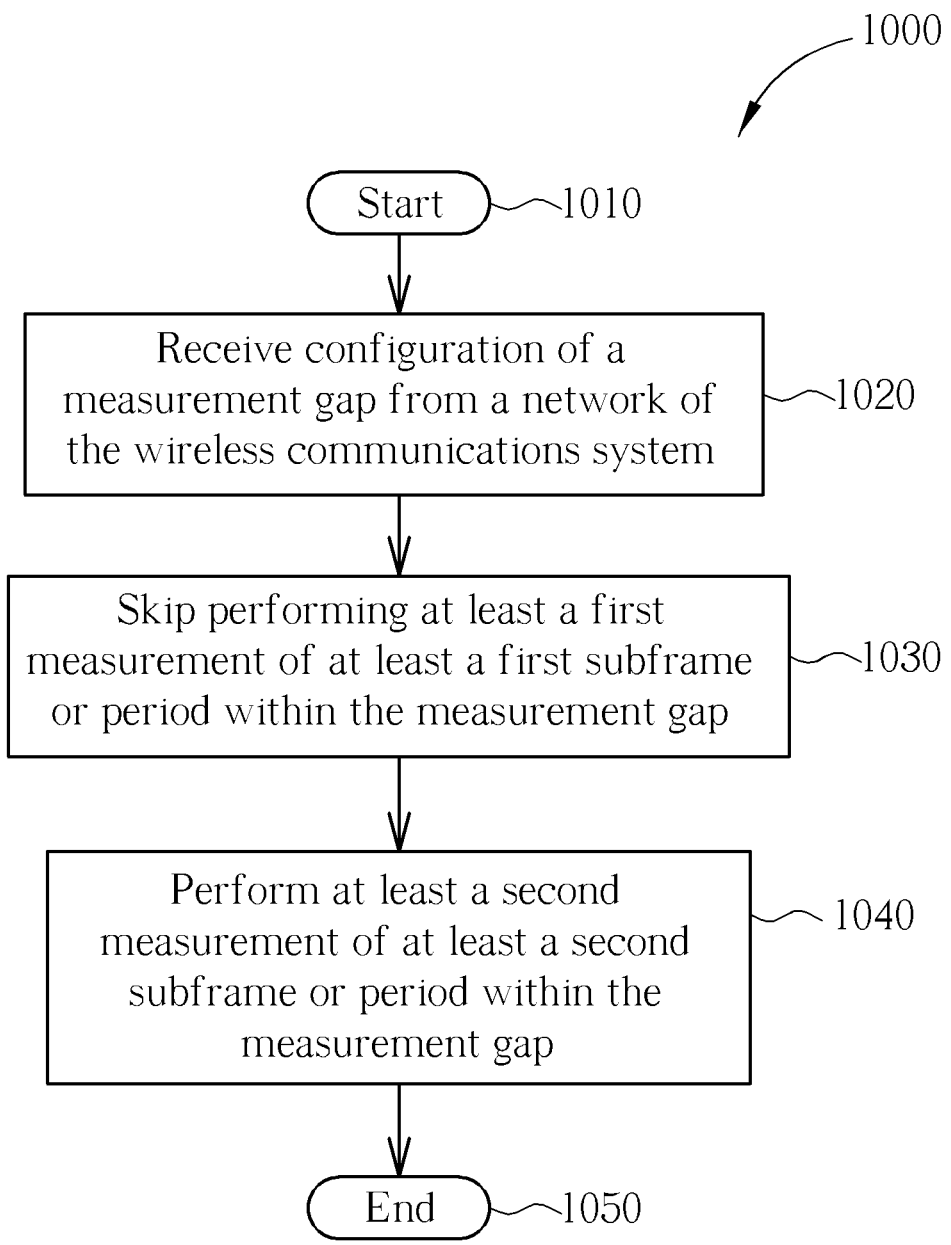

Please refer to FIG. 10, which illustrates a flowchart of an exemplary process 1000. The process 1000 is utilized in a UE of a wireless communications system for handling a measurement. The process 1000 may be compiled into the program code 214 and includes the following steps:

Step 1010: Start.

Step 1020: Receive configuration of a measurement gap from a network of the wireless communications system.

Step 1030: Skip performing at least a first measurement of at least a first subframe or period within the measurement gap.

Step 1040: Perform at least a second measurement of at least a second subframe or period within the measurement gap.

Step 1050: End.

According to the process 1000, the network configures to the UE the measurement gap for the measurement. The UE does not perform the measurement corresponding to the relay during a period of the BS-to-relay transmission (hereafter called FAKE MBSFN subframes, which are used for the BS-to-relay transmission) during the measurement gap, but may perform the measurement corresponding to the base station during the FAKE MBSFN subframes within the measurement gap. Please note that, the configuration of the measurement gap received from the network may indicate the length of the measurement gap.

On the other hand, when the measurement gap is configured to the UE, the UE may perform the measurement corresponding to the relay only during a period of the relay-to-UE transmission (hereafter called non-FAKE MBSFN subframes, which are used for the relay-to-UE transmission) within the measurement gap. In addition, the UE may perform the measurement corresponding to the relay during the non-FAKE MBSFN subframes within the measurement gap, and to the base station during the FAKE MBSFN subframes within the measurement gap.

Please note that, the configuration of the measurement gap may include a length of the measurement gap, and the length of the measurement gap may be dynamic or semi-static according to an uplink or downlink transmission opportunity. In addition, the UE may perform a random access procedure corresponding to the base station or the relay during the measurement gap. The detailed description can be referred from above, so it is not given herein.

Based on the process 1000, how the UE performs the measurement during no transmission (e.g. due to discontinuous UL/DL transmission with the relay deployment) within the measurement gap is clearly specified, thereby avoiding resource waste.

Figure 11:
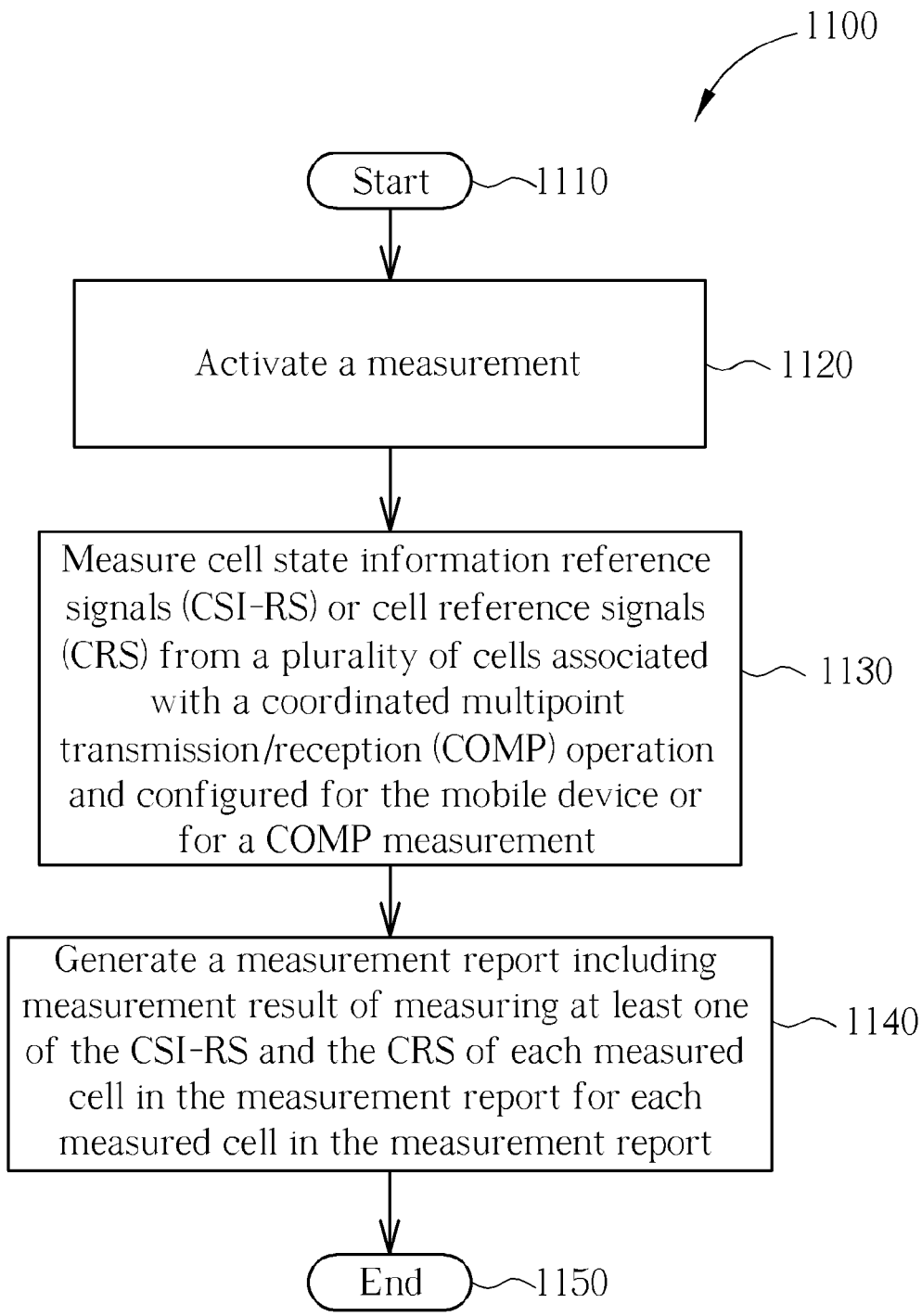

Please refer to FIG. 11, which illustrates a flowchart of an exemplary process 1100. The process 1100 is utilized in a UE of a wireless communications system for handling a measurement. The process 1100 may be compiled into the program code 214 and includes the following steps:

Step 1110: Start.

Step 1120: Activate a measurement.

Step 1130: Measure cell state information reference signals (CSI-RS) or cell reference signals (CRS) from a plurality of cells associated with a coordinated multipoint transmission/reception (COMP) operation and configured for the mobile device or for a COMP measurement.

Step 1140: Generate a measurement report including measurement result of measuring at least one of the CSI-RS and the CRS of each measured cell in the measurement report for each measured cell in the measurement report.

Step 1150: End.

According to the process 1100, the UE measures the CSI-RS or the CRS from each of the plurality of cells in the COMP operation, thereby generating a CSI-RS measurement result or a CRS measurement result for the CSI-RS or the CRS from each of the plurality of cells. The UE may determine whether to measure or report the CSI-RS or the CRS from each of the plurality of cells automatically, or according to a first indication indicated by a donor base station (e.g. a donor base station) of the plurality of cells. Therefore, the measurement report may include only the CSI-RS measurement results, only the CRS measurement results, or the CSI-RS measurement results for some of the plurality of cells and the CRS measurement results for the rest of the plurality of cells. The UE may further include a PCI or a cell global identity (CGI) of each of the plurality of cells in the measurement report, and then sends the measurement report to the donor serving cell, or to at least one of the plurality of cells, or separately sends the measurement report to the measured cells of the plurality of cells.

In addition, the UE may further include a second indication for indicating a type of each of the measured RSs (e.g. the CSI-RS or the CRS), in the measurement report so that the network identifies the RS type of each of the measured RSs with the second indication. Since different RS types (e.g. the CSI-RS or the CRS) may use different patterns, densities and periods, the different RS types shall use different transmission powers. Therefore, by identifying the RS type of the measured RS, the network can apply a proper power control (e.g. power control algorithm, power control steps, or power control offsets) for the CSI-RS or the CRS. Thus, the network can receive the CSI-RS and the CRS with suitable transmission power, thereby avoiding RS interference or RS loss.

Please note that, when the COMP operation is configured to the UE, the donor base station connected with the UE configures to the UE a COMP measurement set, which includes the cells participated in the COMP operation. The COMP measurement set includes a COMP active set, where cells (hereafter called active cells) can perform transmission and reception. An amount of the COMP measurement set is equal or larger than an amount of the COMP active set. On the other hand, the UE in a RRC connected state has a RRC measurement set, which includes cells used for intra/inter cell/frequency/RAT measurement, and prepared for the UE in advance. The cells in the RRC measurement set may be configured by the network, or determined according to detection of the UE. That is, the cells that detected by the UE are included in the RRC measurement set. Therefore, the UE may perform the positioning measurement corresponding to the cells in the COMP measurement set/the COMP active set/the RRC measurement set when the positioning measurement is activated.

Take example base on the concept of the process 1000. The UE measures CSI-RS or the CRS from each of the cells in COMP measurement set/the COMP active set/the RRC measurement set, and then generates a measurement report to the network. The measurement report may include only CSI-RS measurement results for all of the cells in the COMP measurement set/the COMP active set/the RRC measurement set, only CRS measurement results for all of the cells in the COMP measurement set/the COMP active set/the RRC measurement set, or the CSI-RS measurement results for part of the COMP measurement set/the COMP active set/the RRC measurement set and CRS measurement results for the rest of the RRC measurement set/the COMP active set/the RRC measurement set. The UE includes a PCI and/or a CGI of each of the measured cells along with the measurement results in the measurement report, so that the network identifies that the measurement results of the measured cells by the PCIs. In addition, the UE may further include an indication in the measurement report to indicate whether the CSI-RS or the CRS is measured from each of the cells in the COMP measurement set/the COMP active set/the RRC measurement set, and then sends the measurement report to the network. Thus, the network identifies the RS type of the measurement results according to the indication, thereby applying a proper power control procedure for the measured RS type of the measurement results.

Based on the process 1100, how to perform measurement with different RS types, such as the CSI-RS and the CRS, from the cells in the COMP operation is clearly specified. In addition, the UE reports the measurement results to the network along with indications, and thereby the network knows which kind of RS the UE has actually measured, so as to apply proper power control for different RS types.

Figure 12:
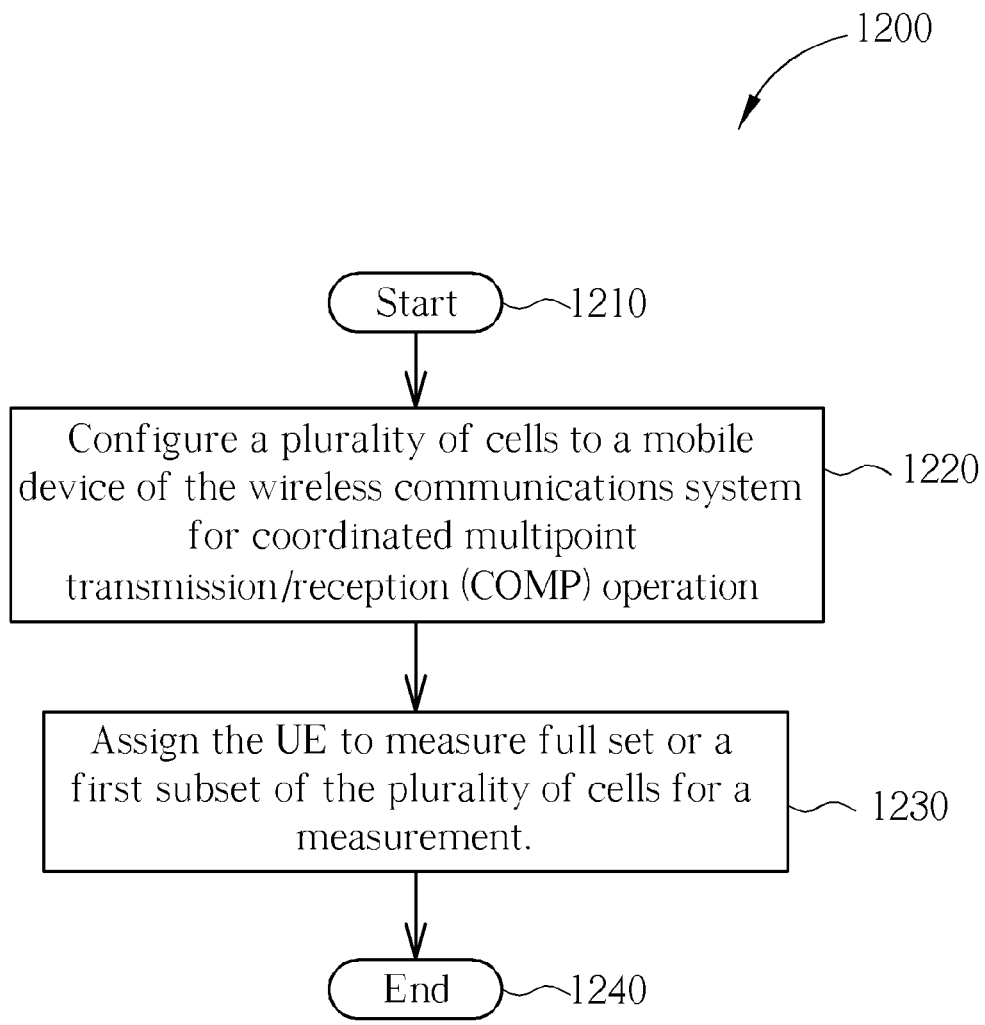

Please refer to FIG. 12, which illustrates a flowchart of an exemplary process 1200. The process 1200 is utilized in a network of a wireless communications system for handling a measurement. The process 1200 may be compiled into the program code 214 and includes the following steps:

Step 1210: Start.

Step 1220: Configure a plurality of cells to a mobile device of the wireless communications system for coordinated multipoint transmission/reception (COMP) operation.

Step 1230: Assign the UE to measure full set or a first subset of the plurality of cells for a measurement.

Step 1240: End.

According to the process 1200, the network configures the UE the plurality of cells (e.g. in the COMP measurement set/RRC measurement set/COMP active set) for the COMP operation, and assigns the UE to measure all or part of the plurality of cells. Since the UE is not required to measure all of the cells in the COMP measurement set/the RRC measurement set/the COMP active set, a length of a measurement gap for the UE to perform the positioning measurement may be decreased, thereby increasing transmission efficiency. Moreover, the network may allow the UE to use unassigned cells of the plurality of cells for uplink transmissions within the measurement gap. That is, the UE can utilize the cells which are not used for the measurement for the uplink transmissions within the measurement gap, so as to improve transmission efficiency of the UE.

In addition, the length of the measurement gap is configured by the network according to the COMP measurement set/the RRC measurement set/the COMP active set. In addition, the length of the measurement gap shall be sufficient to measure the cells in the COMP measurement set/the RRC measurement set/the COMP active set. Thus, UE may have enough time to complete the measurement within the measurement gap.

On the other hand, the length of the measurement gap is configured as a least common multiple (LCM) of reference signal transmission periods (e.g. the CSI-RS and the CRS) of the cells in the COMP measurement set/the RRC measurement set/the COMP active set since the CSI-RS and the CRS use different RS period. Therefore, based on the LCM of the CSI-RS and the CRS transmission periods, the UE may measure the CSI-RS and the CRS within the configured measurement gap. Alternatively, the length of the measurement gap is configured according to LCM of reference signal transmission periods of the cells where the UE responds feedback or are configured with measurement configuration.

Take an example based on the process 1200. The UE is assigned a first subset of the COMP measurement set for measurement, and is configured with a measurement gap. The first subset of the COMP measurement set may include all active cells, a set of the active cells, cells in the COMP active set, or part of cells in the COMP active set. Therefore, the UE measures the RSs from the first subset of the COMP measurement set within the measurement gap. Please note that, the UE may measure the RSs from part of the first subset of the COMP measurement set, or all of the first subset of the COMP measurement set according to the configuration of the network. In this situation, the length of the measurement gap may be determined according to the first subset, thereby the UE can complete the positioning measurement for the cells in the first subset. Moreover, the cells in the first subset, which have not participated in the measurement, can be utilized for UL transmission (e.g. UL transmission, feedback, control signalling, or measurement report) during the measurement gap.

In addition to the COMP measurement set, the concept of the process 1100 can be also applied for the RRC measurement set/the COMP active set. The detailed description can be referred from the abovementioned example, so it is not given herein.

Please note that, the abovementioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, the exemplary method and means are provided to define how the relay involving in the positioning measurement, and thereby the UE can perform positioning measurement within the relay deployment.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A method of handling measurement for a mobile device in a wireless communications system, the method comprising:

activating a measurement;

measuring cell state information reference signals (CSI-RS) or cell reference signals (CRS) from a plurality of cells associated with a coordinated multipoint transmission/reception (COMP) operation and configured for the mobile device or for a CoMP measurement;

generating a measurement report including measurement result of measuring at least one of the CSI-RS and the CRS of each measured cell in the measurement report for each measured cell in the measurement report; and including a second indication for indicating a type of each of the measured reference signals, in the measurement report so that the network identifies the type of each of the measured reference signals with the indication.

2. The method of claim 1, further comprising sending the measurement report to a donor serving cell of the plurality of cells, wherein the donor serving cell is controlled by a donor base station which configures the plurality of cells associated with the COMP operation to the mobile device; or sending the measurement report to at least one of the plurality of cells associated with the COMP operation, or sending separated measurement reports to corresponding measured cells of the plurality of cells associated with the COMP operation.

3. The method of claim 1, wherein measuring the CSI-RSs or the CRSs from the plurality of cells associated with the COMP operation and configured for the mobile device or for COMP measurement comprises:

for each of the plurality of cells, automatically determining whether to measure the CSI-RS or the CRS or whether to report the measurement of the CSI-RS or the CRS; or determining whether to measure the CSI-RS or the CRS or whether to report the measurement of the CSI-RS or the CRS according to a first indication received from the donor serving cell.

4. The method of claim 1, wherein the network identifies the type of each of the measured reference signals with the indication, and then applies a power control procedure for the reference signal type being measured according to the indication.

5. The method of claim 4, wherein the power control procedure comprises different power control steps or offsets for the measured reference signals of different types, and the power control steps or offset for the measured reference signals of different types are configured dynamically or semi-statically.

6. The method of claim 1, further comprising:
including a physical cell identity (PCI) or a cell global identity (CGI) of each of the plurality of cells in the measurement report.

\* \* \* \* \*